Aug. 27, 1968     L. B. PALMER ET AL     3,399,106
EMBOSSED RESINOUS COMPOSITIONS AND PROCESS FOR PREPARING SAME
Filed Jan. 3, 1966     3 Sheets-Sheet 1
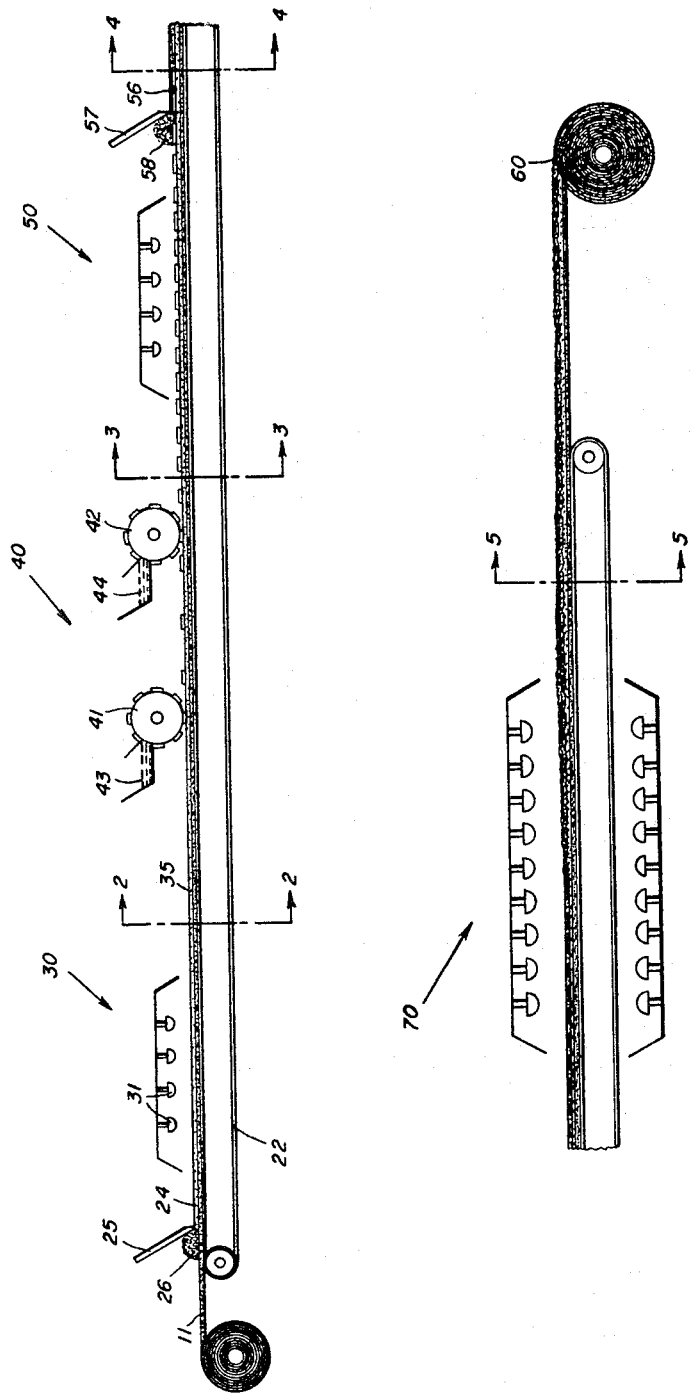
INVENTORS.
LEON B. PALMER
ROBERT P. CONGER
BY
ATTORNEY

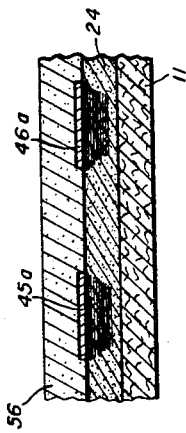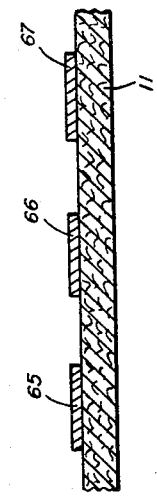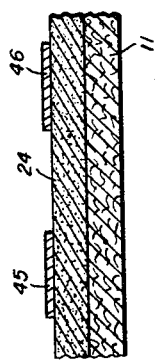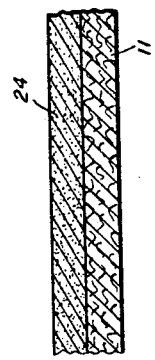

Aug. 27, 1968  L. B. PALMER ET AL  3,399,106
EMBOSSED RESINOUS COMPOSITIONS AND PROCESS FOR PREPARING SAME
Filed Jan. 3, 1966  3 Sheets-Sheet 3
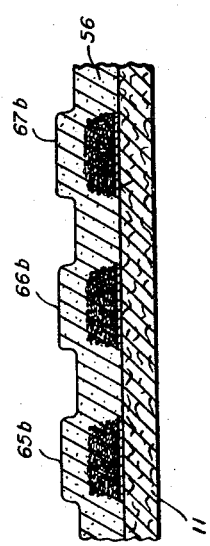
INVENTORS.
LEON B. PALMER
BY ROBERT P. CONGER
ATTORNEY

United States Patent Office 3,399,106
Patented Aug. 27, 1968

3,399,106
EMBOSSED RESINOUS COMPOSITIONS AND
PROCESS FOR PREPARING SAME
Leon B. Palmer, Little Falls, and Robert P. Conger, Park Ridge, N.J., assignors to Congoleum-Nairn Inc., Kearny, N.J., a corporation of New York
Filed Jan. 3, 1966, Ser. No. 518,073
15 Claims. (Cl. 161—119)

This invention relates to resinous composition products and particularly to methods for producing resinous composition products having an embossed surface and to the products thus produced.

Sheets of resinous composition have found widespread use as decorative and wear-resistant coverings for a wide range of products. Such sheets, for example, are used extensively as wall, floor and table coverings, book covers, decorative containers, as fabrics for use as upholstery, clothing and automobile interiors, and the like. In many instances, the resinous composition sheets are applied or formed on backings such as woven fabrics, paper, felt, metal, wood, glass, and the like. These backing materials have many purposes, the most common being added strength and serviceability. It is common practice to emboss the surface of such sheets to give added decorative appeal and, in many instances, further utility. Typical of the types of embossings are those which simulate leather or textured cloth, such as linen. In some instances, the embossed areas are filled in with pigmented ink by techniques known as "Spanishing" or "valley printing." Designs have also been printed on the surface of resinous composition sheets and, in many instances, the designs have been protected by the application of a transparent or translucent overcoating.

Embossing of resinous composition sheets is conventionally accomplished with an embossing roll or plate which has been engraved or otherwise treated to create the design desired in raised relief on its surface. The sheet and/or embossing surface is heated and the design pressed into the heat-softened sheet.

Various methods have been suggested for producing resinous composition products having a textured or embossed surface without utilizing embossing rolls. Embossing rolls are expensive to produce and when combined with a valley printing operation are difficult to control. In some instances, it is desired to print a design and then emboss in register with the design. Such an operation requires very complex equipment. Additionally, embossing of curved or irregular surfaces is very difficult.

One method which eliminates embossing rolls is disclosed in U.S. Patent 2,961,332 which issued to R. Frank Nairn on Nov. 22, 1960. A similar procedure is disclosed in U.S. Patent 2,920,977, issued Jan. 12, 1960. In accordance with these patents, a uniform layer of resinous composition is formed on a base by printing a number of different resinous compositions, some of which contain a blowing agent. The uniform layer is then heated to decompose the blowing agent in the printed compositions and fuse the entire composition. The product has an irregular or textured surface conforming to the amount of blowing agent in the various printed compositions. This procedure is limited to printing apparatus which can apply a relatively thick layer of printing composition since the thickness of the raised areas depends on the amount of composition applied. Another method is disclosed in U.S. Patent 2,964,799 which issued to P. E. Roggi et al. on Dec. 20, 1960. According to this patent, a foamable resinous composition is formed into a self-supporting sheet of fused composition. Heat is then applied to the foamable composition sheet at various points to cause the blowing agent at those points to decompose and form a cellular structure. The raised areas in the finished sheet correspond to the points of heat application. In U.S. Patent No. 3,293,094, issued Dec. 20, 1966, there is disclosed a unique method of producing an embossed resinous composition by printing a design on the surface of a foamable resinous composition layer containing a blowing agent. Portions of the printed design contain an inhibitor or regulator which, upon heating, will migrate into the foamable composition. This inhibitor will either raise or lower the decomposition temperature of the blowing agent in the area it contacts. The foamable layer is then carefully heated so that the blowing agent decomposes in either the inhibited or the uninhibited areas. The result is a product which has an embossed surface which corresponds to the printed design.

The primary object of the invention is to provide a simple process for producing a resinous composition product having a textured or embossed surface. Another object is to provide such a process which is readily adaptable to standard printing equipment. Another object of the invention is to provide an embossed product of novel construction. A further object of the invention is to provide a process which allows the production of resinous composition sheets having embossed areas in register with a printed design. A still further object is to provide an embossing process which is readily adaptable to curved and irregular surfaces. Other objects and the advantages of the invention will appear hereinafter.

In accordance with the invention, it has been discovered that it is possible to print a blowing agent on a resinous composition layer containing a component in which the blowing agent is soluble and allow the blowing agent to migrate into the resinous composition layer and then heat the layer to decompose the blowing agent within the layer, without decomposing the blowing agent which remains on the surface. The resulting product will be raised at the area of blowing agent application caused by the formation of foam cells within the layer in these areas. In order for the invention to be effective, it is necessary for the blowing agent which migrates to decompose at a temperature lower than the blowing agent which remains on the surface. This is accomplished by having an accelerator in the resinous composition which lowers its decomposition temperature. The heating of the resinous layer is selective so that only the migrated blowing agent is decomposed. If the blowing agent in the printed area decomposes, it will form one large cell and disrupt the surface. If a wear layer has been applied over the surface, it will cause the wear layer to delaminate at such areas. This procedure makes possible the production of a large range of resinous composition products having embossed surfaces by simply applying to the surface in the design desired a blowing agent and then heating the composition. The resulting product is raised at the area of blowing agent application. The printing composition can be transparent so that the appearance of the product is not altered other than in being embossed. Alternately, the blowing agent can be part of a pigmented ink composition so that the colored ink or colors of the inks appear in the areas of application. Further, the blowing agent can be applied to the surface of a supporting base over which the resinous composition layer is applied. The base can remain as part of the final product or be removed. The height of the raised areas can be controlled by varying the concentration of blowing agent or the efficiency of the system.

This process makes possible the production of a product having embossed surfaces which can be in complete register with a printed design. Additionally, the process makes possible the utilization of printing apparatus as an embosser, thereby eliminating the need for expensive embossing rolls and related equipment. Further, it allows the embossing of a surface without exerting pressure on the surface and without regard to the shape of the surface. The number of products which can be produced by the process is unlimited. It can be used for producing floor, wall and ceiling coverings, drapery, upholstery and clothing materials, tents and the like, and, in fact, wherever resinous plastic sheets or compositions are utilized. It is readily adaptable to decorating any surface on which resinous compositions can be applied such as automobile interiors, boots, boxes and packing cartons, book covers, maps, road markers, glass and plastic containers, and the like.

The invention will be better understood from the following detailed description of various embodiments of the invention when read in connection with the drawings wherein—

FIGURE 1 is a schematic representation of one method of producing a sheet in accordance with the invention;

FIGURES 2 to 5 are enlarged cross-sectional views of the product in various stages of manufacture as shown in FIGURE 1, the relative relationship of the various layers are not in proportion; and FIGURES 6 to 9 are enlarged cross-sectional views of various stages of an alternate process for preparing a product in accordance with the invention.

In accordance with one embodiment of the invention a resinous polymer composition sheet is produced having a textured or embossed surface by applying a layer of a resinous polymer composition to a base, heating the layer to at least partially gel the composition, printing on the surface of the gelled sheet a composition containing a blowing agent, applying a second resinous polymer composition over the printed surface, thereafter heating the composite structure to cause the blowing agent to migrate into the resinous composition without decomposing the blowing agent and then continuing the heating to fuse the composition and decompose the blowing agent and form a cellular foam composition in the area containing the blowing agent. This procedure provides a simple method for producing a product having a substantially thick wear-resistant surface and a textured surface. As is apparent, the blowing agent can be added to one or more printing inks which make up a design printed on the gelled composition.

As an alternate method, the blowing agent can be printed on a supporting base and then the resinous polymer composition applied over the blowing agent. The base in this instance can be, if desired, a transfer sheet and the design applied to form a decalcomania. Using this system, a solvent for the blowing agent can be in the composition to cause the migration of the blowing agent. Additionally, the resinous composition can be formed into a fused or partially fused sheet, such as by calendering, and then the blowing agent printed on either surface of the sheet.

In another alternate method, the application of the wear layer can be omitted until after the decomposition of the blowing agent and the fusion of the cellular foam layer. The wear layer can then be applied by any suitable means, such as a spray coating, laminating a film, or the like. If desired, the solid wear layer can be omitted entirely.

As indicated, the invention has the advantage of eliminating the need for embossing rolls and pressure to produce a textured or embossed surface and thereby greatly reduces the cost. The time required to produce an embossing roll is substantially greater than a printing cylinder. In addition, errors in a printing cylinder are easier to correct than in an embossing cylinder. One of the most advantageous features of the invention is that the textured or embossed areas can be in complete register with a printed design. It should be understood, however, that the blowing agent can also be applied at random rather than as an exact reproducible design.

One arrangement of apparatus is shown in FIGURE 1 of the drawings. Referring to the drawings, a web, such as a felt sheet or release paper 11, is placed on a conveyor, as for example, a continuous belt 22. A coating 24 of resinous composition is applied to the upper surface of the base 11 by any suitable means such as a reverse roll coater, a doctor blade or similar coating apparatus. If a doctor blade 25 is used, a reservoir of the resinous composition 26 is maintained behind the blade allowing a uniform coat of the composition to be applied to the surface of the felt. The coated base is then passed through a heating unit generally indicated at 30 which can be any conventional heating means such as a bank of infra-red heating lamps 31. The heating unit supplies sufficient heat to at least partially gel the resinous coating. The gelled coating 35 is then passed to a rotogravure printing unit generally indicated at 40, having printing cylinders 41 and 42, which are etched to print a design with a suitable ink on the surface of the gelled sheet. The cylinders pick up printing ink compositions 43 and 44 on their etched surface and apply the printing compositions 45 and 46 on the surface of the gelled layer 35. At least one of the printing ink compositions contains a blowing agent. The etched printing cylinders have the engraved areas substantially enlarged in the drawing for purposes of illustration. The printing press illustrated has only two printing cylinders, but any number desired can be used. The printing composition is conventionally dried in the printing press. The printed gelled sheet is then passed to an oven generally indicated at 50 which can be of a type similar to the first heating unit 30. The printed sheet is heated to cause the blowing agent to migrate into the resinous composition in the areas of application 45a and 46a without decomposing the blowing agent. A second coat 56 of resinous composition is then applied over the printed surface by any conventional coating means such as a doctor blade 57 which supplies the composition from a reservoir 58 held back of the doctor blade. This second coating 56 can be transparent, translucent, or pigmented opaque. The inks will not be visible from the surface of the product if the coating is opaque. After applying the second coating 56, the composite structure is then passed through a heating unit generally indicated at 70. The heating unit can be any heating apparatus such as a hot air oven or infra-red heat lamps. It is preferred to have a heating unit which heats both surfaces of the sheet. The heating unit raises the temperature of the compositions on the base sheet sufficiently high to cause the decomposition of the blowing agent which has migrated into the first coat 24 and to completely solvate and fuse both resinous compositions of coats 24 and 56. The product is thereafter cooled and wound on a collecting roll 60. The product has formed cellular foam in areas 45a and 46a which causes the corresponding areas 45b and 46b on the surface to be raised. If the product is going to be used in areas which are not subjected to substantial wear, the second coat can be omitted entirely. As indicated, the second coat of resinous composition can be transparent if a design is printed on the first coat or it can be opaque. The backing can remain as part of the product or it can be removed from the product.

The cross-section of another form of a product is shown in FIGURE 9. In this modification, as shown in FIGURES 6 to 8, the printing ink 65, 66 and 67 containing the blowing agent is appiled directly to the base 11. A resinous polymer composition coating 56 is then applied over the printed surface and heated to cause the blowing agent to migrate 65a, 66a and 67a into the composition coating 56. In this illustration, the migration of the blowing agent is upward. The composition is then heated to decompose the blowing agent and fuse the composite layer 56. The blowing agent which migrates into the composite layer at 65a, 66a and 67a has decomposed and formed a cellular structure in the migration area. These cellular areas cause the surface of the coating to be raised 65b, 66b and 67b. The resulting product using this method can be identical in appearance to the products resulting from the other methods, except that the solid portion of the resinous coating 56 is thinner over the area of blowing agent application.

The backing web utilized will depend in large measure on the product to be produced. If the backing web is to remain as part of the finished product, then it can be formed of a resinous composition, felted sheet, woven or knitted fabric or the like. Any of the thermoplastic or elastomeric resinous compositions which can be formed into a sheet can be used to form backing sheets for use in the invention. Typical of the resins which can be compounded with plasticizers and fillers and sheeted to form a sheet are such resins as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention. Suitable backing sheets also include woven fabrics formed of such fibers as cotton, wool, asbestos and various synthetic fibers.

If the backing is to be removed from the final product, it is preferably a release paper. Such a paper conventionally has a coating on its surface to allow the plastic sheet to be easily stripped from the paper. Typical coatings used are clays, silicone compositions, polyvinyl alcohol, and similar special compositions well-known in the art.

In accordance with the invention, a resinous polymer composition is applied to the base and, in some cases, a second layer of resinous polymer composition is utilized. The resinous binder is preferably one that is coalesced or fused into a continuous film by the application of heat since this allows gelling of the composition to produce a good printing surface. In this specification and claims, the term "fused" is intended to mean that state which is achieved in a resinous composition during the transition from a random dispersion or suspension of discrete resin particles in plasticizer to one of a homogeneous consistency and uniform viscosity and rheological characteristics.

The composition is also preferably a dispersion of resin in a liquid medium. The dispersion medium can be water in the case of an aqueous latex, organic solvent as an organosol or plasticizer as a plastisol. Best results have been obtained with a dispersion of resin in a plasticizer which is conventionally termed a plastisol. A plastisol has appreciable fluidity at normal room temperature, but is converted by heat into a fused, flexible, tough thermoplastic mass. Plastisols are preferred since it is unnecessary to remove large volumes of carrier as is necessary with a latex or organosol.

The preferred and most widely used resin for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl esters such as vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethyl-butadiene-1,3-piperylene, divinyl ketone and the like. Although such vinyl chloride resins are preferred, as is apparent, the compositions can be formed from any resin which can be foamed with a blowing agent and the invention is not intended to be limited to any particular resin or group since many other types and groups of resins will occur to those skilled in the art and the particular resin selected does not form part of the invention. Other resins which can be mentioned, however, are polyethylene; polypropylene; methacrylates; synthetic rubber, such as neoprene, silicone, SBR and nitrile; polyurethanes, polyamides, polystyrene; phenolics, urea-formaldehydes; cellulose esters-epoxy; and silicones.

Resins adaptable for use in formulating vinyl plastisols are commonly referred to as dispersion grade resins. Such resins are available having particle sizes of from about 0.02 to about 2 microns in contrast to calender grade vinyl resins which are available in particle sizes ranging up to 35 microns. Dispersion grade resins are usually of higher molecular weight than calender grade resins and have particle surfaces of a hard, horny nature. Polymers of vinyl chloride having specific viscosity above about 0.25 and preferably between 0.30 and 0.70 as measured in a solution of 0.4 gram of resin in 100 milliliters of nitrobenzene at 30° C. are particularly effective (ASTM D1243–60). Specific viscosity is a comparison of the flow time for a control of pure nitrobenzene solvent as compared to this solution of nitrobenzene and resin. The specific viscosity is determined as the sample flow time divided by the control flow time, minus 1. The specific viscosity is an effective measure of relative molecular weight of the polymer, the higher the specific viscosity the higher being the molecular weight.

In the formulation of plastisol compositions for use in the invention, the fine particle size resin is uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Coating compositions for use in the invention preferably contain from about 20 to about 150 parts plasticizer per 100 parts resin with a range of about 50 to about 80 parts plasticizer per 100 parts resin being particularly effective. The viscosity of plastisol compositions can also be reduced by the addition of small amounts of a volatile diluent not exceeding about 10 parts per 100 parts resin. Useful diluents include benzene, toluene, methyl ethyl ketone, petroleum solvents such as V.M. and P. Naphtha (Boiling Range of 190–275° F.) and the like. Organosols for use in the invention preferably contain about 20 to about 55 parts of plasticizer per 100 parts of resin with about 30 to 40 parts of plasticizer per 100 parts of resin being particularly preferred, whereas plastisols usually contain about 45 to about 150 parts of plasticizer per 100 parts of resin. The amount of solvent utilized depends in large measure on the coating viscosity best suited for the coating apparatus utilized. As indicated above, it can also promote the solubility of the blowing agent in the resinous composition layer.

The selection of the plasticizer is important in determining the strength and flexibility of the coating and also in influencing the viscosity and viscosity stability of the composition and the foaming characteristics of the composition. It is essential to the invention for the blowing agent to be soluble in the plasticizer. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di (2-ethylhexanoate), diethylene glycol dipelargonate, tri-ethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they import good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of two millimeters of mercury or less at 400° F. has been found particularly satisfactory.

It is essential to the invention that an accelerator or catalyst be present in the resinous polymer composition layer. It is common practice to use such accelerators to lower the decomposition temperature of blowing agents. Typical types of accelerators are various metal salts such as dibasic lead phosphite, dibasic lead stearate, dibasic lead phthalate, lead oxide, and similar lead salts, zinc salts such as zinc laurate, zinc oxide, zinc stearate, zinc carbonate, zinc salt of mercapto-benzothiazole, zinc octoate, zinc naphtholate, dibutyl tin maleate, stannous stearate, stannous octoate, triphenyl tin octoate, cadmium stearate and cadmium octoate. These agents can also serve as stabilizers for the composition. The accelerator is usually present in about 0.1 to about 10 parts per hundred parts of resin, with 0.5 to about 5 parts being preferred.

The coating compositions can contain pigments in accordance with the particular color desired. Any of the organic and inorganic pigments well known in the art for plastic compositions can be used. Normally, from about 0.5 to about 5 parts pigments per 100 parts resin are used.

The printing composition contains an effective amount of blowing agent which is soluble in the resinous composition layer. The larger the amount of blowing agent within practical limits used, the greater is the expansion of the foam. Blowing agents are well known in the art and the particular blowing agent selected can be of any type. The only limitation is that it must be soluble in at least one component of the resinous composition. Such solubility can be readily determined by a simple test.

Typical types of blowing agents which can be mentioned include substituted nitroso compounds

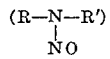

substituted hydrazides (RSO₂NHNHR′), substituted azo compounds (R—N=N—R′), acid azides (R—CON₃), guanyl compounds

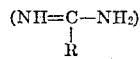

and the like wherein R and R′ are groups which make the compound organophillic. The blowing agents which have been found particularly effective have the following general formula

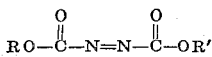

wherein R and R′ are hydrocarbon groups containing from one to twenty carbon atoms and can be aliphatic, alicyclic, aromatic or a combination thereof. Typical examples of suitable groups are methyl, ethyl, propyl, isopropyl, cyclohexyl, phenyl, phenethyl and the like.

Blowing agents for use in the invention must be decomposed an effective amount at a temperature below the decomposition temperature of the resin used. The preferred blowing agents are those that decompose above the elastomeric point of the resin composition since this enables at least partial gelling of the foamable coating so that it will retain the gas generated. Such blowing agent usually decomposes above 200° F. As an illustration, with the preferred vinyl chloride polymers, a blowing agent decomposing between about 300° F. and about 450° F. can be used. The minimum initial decomposition temperature must be sufficiently high to prevent premature gas evolution occurring during processing.

The resinous polymer composition is formed into a film of the desired thickness and then heated to gel the composition to give a good printing surface for the application of the blowing agent. In this specification and claims, the term "gel" includes both the partial (at least the elastomeric point) and complete solvation of the resin or resins with the plasticizer (fused). When using the preferred polyvinyl chloride composition, the temperature of the composition is preferably raised to about 240° F. to about 275° F. Generally, the actual oven temperature would be a slightly higher temperature to have the composition reach the desired temperature. If the composition is to be formed into a self-supporting film, then the temperature would conventionally be high enough to fuse the composition.

While the resinous polymer composition is described as being applied as a coating to the base, it is apparent that this composition can also be applied as a preformed sheet or the composition can be molded, extruded, calendered or otherwise formed into any desired shape depending on the ultimate use of the product.

The blowing agent is applied to one surface of the resinous polymer composition or on a base in any desired design. It is preferably applied in a liquid carrier which allows better control of the concentration of blowing agent. If the blowing agent is not soluble in the carrier, it can be dispersed with the carrier in the conventional paint-making technique to produce a fine dispersion. As previously indicated, the blowing agent composition can be transparent or pigmented. It is conveniently formulated in the manner of a printing ink. Such compositions usually contain a carrier for the pigment, such as a low molecular weight vinyl resin, and, in some cases, a plasticizer for the resin to give good adhesion to the printing surface. The blowing agent migrates into the area of the resinous polymer composition above or below where it is deposited. By varying the concentration of the blowing agent, the thickness of its application or its penetration (solubility or diffusibility) rate into the resinous polymer composition, the degree of foaming can be controlled to produce foam layers of various heights or thicknesses. Unusual design effects can be obtained when the blowing agent is printed with a multicolored design wherein some of the ink compositions contain varying amounts of blowing and others do not contain any blowing agent.

The amount of blowing agent utilized in the ink will determine in large measure the degree of foam thickness. Particularly good results have been obtained with from 5 to about 75 percent of blowing agent based on the weight of the dry solids (non-volatile) in the ink composition.

After the printing step, a second layer of resinous composition can be applied and, as indicated above, in some cases it is desirable. The second coating, as indicated above, can be the same or different composition from the first coating. If different compositions are used which are not readily compatible, an adhesive layer can be applied before the second coating. In the event that a decoration has been printed on the surface of the first coating, it is necessary for the second coating to be of transparent or translucent composition so that the printed design can be visible through the second coating. This second coating can serve as a wear layer and, therefore, its thickness will depend on how much wear is desired in the final product. As a general rule, a coating of from about 0.002 to about 0.025 inch is sufficient to give the product good wearing qualities. In some instances, it may be desirable to produce the embossed effect prior to the application of the wear layer.

The composition is heated to a temperature sufficient to fuse the resin by completely solvating the resin with plasticizer and to decompose the blowing agent without decomposing the blowing agent in the ink composition remaining on the surface. The temperature of the entire mass of composition upon the backing must attain the fusion temperature of the resin in order that a product of maximum strength is to be attained. Using the preferred vinyl resin, fusion is attained at a temperature of about 300° F. to about 375° F.

If volatile components are used in the compositions, care must be taken that they are essentially completely removed from the film prior to fusion. This can be accomplished by heating the composition at a temperature substantially below the fusion temperature and minimum decomposition temperature of the blowing agent for sufficient time to remove the volatile material. For example, if 5 percent of F.M. & P. Naphtha (boiling range of 190–275° F.) is used, heating at 200° F. for 5 minutes will remove sufficient material so that fusion and blowing at 400° F. can be accomplished with good cell structure and freedom from blisters. This preheating also helps the migration of the blowing agent.

The foamed and fused product, after leaving the heating oven, is permitted to cool. Cooling is particularly important since any premature handling of the product immediately after foaming might cause partial collapse and distortion of the foam structure. Cooling can be brought about by mere exposure of the product to the atmosphere; thus, the speed of motion of the backing along the processing apparatus and the spacing between the fusion oven and the end of the apparatus can be adjusted so that the product is given sufficient time to cool. Alternately, cooling can be accelerated by blowing jets of cooled air upon the fused and foamed composition or by means of fine sprays of water upon the fused and foamed composition or by utilizing cooling rolls.

After being cooled, the product is withdrawn from the processing apparatus. It can be used in the form of a sheet as produced or can be cut into tiles or other appropriate shapes depending on the particular use to which the product is to be put. Products produced in accordance with the invention have a marked three-dimensional textured appearance in perfect register with a printed design, if desired.

The products of this invention can find wide use. They make excellent floor, wall and countertop coverings. Additionally, the products make excellent upholstery material, drapes and curtains enabling the production of a wide range of effects. Further, the process offers an excellent method of decorating objects such as bottles, cans, books, displays and the like. Many additional applications of this invention will occur to those skilled in the art.

The following examples are given for purposes of illustration:

Example 1

A plastisol was formulated by mixing the following ingredients on a Cowles Mixer:

| | Parts |
|---|---|
| Polyvinyl chloride (dispersion grade, specific viscosity 0.60) | 50 |
| Polyvinyl chloride (dispersion grade, specific viscosity 0.40) | 50 |
| Butyl benzyl phthalate | 25 |
| Di (2-ethylhexyl) phthalate | 45 |
| Titanium dioxide | 7 |
| Dibutyl tin maleate (accelerator) | 1 |
| V.M. & P. Naphtha (boiling range 190–275° F.) | 5 |

Example 2

A plastisol was formulated by grinding the following ingredients on a three-roll mill:

| | Parts |
|---|---|
| Polyvinyl chloride (dispersion grade, specific viscosity 0.60) | 50 |
| Polyvinyl chloride (dispersion grade, specific viscosity 0.40) | 50 |
| Dioctyl phthalate (plasticizer) | 55 |
| Dodecyl benzene (secondary plasticizer) | 10 |
| Dibasic lead phosphite (accelerator) | 2.5 |
| Titanium dioxide (pigment) | 5 |

Example 3

A plastisol was formulated by mixing the following ingredients:

| | Parts |
|---|---|
| Polyvinyl chloride (dispersion grade, specific viscosity 0.60) | 35 |
| Polyvinyl chloride (dispersion grade, specific viscosity 0.40) | 35 |
| Polyvinyl chloride (suspension grade, specific viscosity 0.35) | 30 |
| Butyl benzyl phthalate (plasticizer) | 55 |
| Alkyl aryl hydrocarbon (secondary plasticizer) | 10 |
| Titanium dioxide | 5.0 |
| Lead stearate | 1.0 |

Example 4

A plastisol was formulated by mixing the following ingredients:

| | Parts |
|---|---|
| Polyvinyl chloride (dispersion grade, specific viscosity 0.60) | 100 |
| Di(2-ethylhexyl) phthalate (plasticizer) | 60 |
| Alkyl aryl hydrocarbon (secondary plasticizer) | 5 |
| Dibasic lead phosphite | 1.0 |
| Titanium dioxide | 2.0 |

Example 5

The following ingredients in the proportions indicated were mixed:

| | Parts |
|---|---|
| Polyvinyl chloride (dispersion grade, specific viscosity 0.50) | 100 |
| Dioctyl phthalate | 17 |
| Tricresyl phosphate | 8.5 |
| Epoxidized soya oil | 8.5 |
| V.M. & P. Naphtha (boiling range 190–275° F.) | 18.0 |
| Methyl ethyl ketone | 2.0 |

Example 6

A size coat is prepared having the following formulation:

| | Parts |
|---|---|
| Polyvinyl chloride latex (preplasticized) | 53 |
| Carboxy vinyl polymer (thickener 2% in water) | 35 |
| Water | 12 |
| Ammonia to raise pH to 7–8. | |

Example 7

A size coat is prepared having the following composition:

| | Parts |
|---|---|
| Acrylic resin (soft) | 50 |
| Acrylic resin (hard) | 50 |
| Water | 100 |

Examples 8 to 10 are typical printing compositions prepared by mixing the ingredients together.

Example 8

| | Parts |
|---|---|
| Polyvinyl chloride | 12.1 |
| Methyl ethyl ketone | 81.4 |
| Pigment | 2.0 |
| Diethylene bis(ethyl azodicarboxylate) | 10.0 |

Example 9

| | Parts |
|---|---|
| Vinyl chloride-vinyl acetate copolymer | 2.3 |
| Methyl ethyl ketone | 14.0 |
| Diethyl azodiformate | 0.5 |

Example 10

| | Parts |
|---|---|
| Vinyl chloride-vinyl acetate copolymer | 2.8 |
| Methyl ethyl ketone | 15.5 |
| $TiO_2$ | 2.6 |
| Diisopropyl azodiformate | 2.5 |

Example 11

The plastisol of Example 2 is applied as a uniform coating of about 0.012 inch in thickness on the surface of a release paper. The release paper has a coating of a complex compound of the Werner type in which a trivalent nuclear chromium atom is coordinated with an acrylic carboxylic acido group having at least 10 carbon atoms. Such a composition is disclosed in U.S. Patent 2,273,040, issued Feb. 17, 1942. The plastisol coating is then heated to a temperature of 275° F. to gel the composition. The gelled coating is then cooled. The cooled gelled product is then passed through a rotogravure press which prints a five-color design on the surface of the gelled coating. Some of the printing composition applied had the formula of Example 10. The remaining printing composition did not contain any blowing agent. The organosol composition of Example 5 was then coated on the surface of the printed, gelled coating to form a uniform coating of 0.005 inch in thickness. The coatings were then heated to a temperature of 375° F. to fuse the compositions and completely decompose the blowing agent. The fused and foamed product was then cooled and the release paper stripped from the back of the product. The resulting embossed product has a solid resinous wear layer with raised areas in its surface corresponding to the places where the ink containing the blowing agent was applied. The raised areas were about 0.020 inch in height.

Example 12

The procedure of Example 11 was generally followed, except that the design was first printed on the surface of the release paper prior to the application of the foamable plastisol composition. Only the portions of the design containing the blowing agent were printed. The resulting product was identical to that of Example 11 in the raised areas of the sheet, but it did not have a printed design between the layers.

Example 13

The plastisol of Example 3 was applied as a uniform coating of 0.012 inch on the surface of an 0.025 inch thick cellulose felt sheet impregnated with 20 percent polyvinyl acetate. The felt sheet had previously been coated with the size coating of Example 6 at the rate of 0.025 pound per square yard and dried. The plastisol coating was then heated to a temperature of 275° F. which required heating for two minutes, thereby gelling the coating. The gelled sheet was then passed through a rotogravure press which applied a design to its surface with five different ink compositions. Two of the ink compositions had the composition of Example 9. The organosol composition of Example 5 was applied to the surface of the printed surface to form a uniform coating of 0.006 inch in thickness. The sheet was then passed through an oven which gradually raised the temperature of the coating to 350° F. The coatings fused and the blowing agent decomposed. The product had raised areas corresponding to the location of the ink composition containing the blowing agent. The height of the raised areas was 0.010 inch.

Example 14

A plastisol was prepared according to Example 2. The plastisol was applied as a uniform layer of 0.012 inch in thickness on the surface of a felt sheet 0.045 inch in thickness. The felt sheet was composed of cellulosic fibers impregnated with 5% of a urea-formaldehyde resin and 25% of a copolymer of butadiene-acrylonitrile. The sheet had been heated to cure the urea-formaldehyde resin. The felt sheet had previously been coated with the size coating of one-half methyl methacrylate and one-half butyl acrylate at the rate of 0.025 lb. per square yard followed by drying the size coat. The plastisol-coated felt was then passed through an oven heated at 300° F. at the rate of 60 ft. per minute. The oven was 90 ft. long. The sheet was then allowed to cool and fed to a conventional rotogravure printing machine which applied a decoration on the surface of the sheet with five different vinyl printing inks. One of the inks had the composition of Example 9. Because of the soft surface of the gelled coating, excellent fidelity of print was obtained. The printed sheet was then passed to a reverse roll coater where an organosol coating of 0.005 inch in thickness was applied having the composition of Example 5. The sheet was passed from the coater at a speed of 30 ft. per minute into an oven having three zones each of 30 ft. in length. The zones were heated to 325° F., 375° F. and 400° F., respectively. During this heating operation, the composition became fused and the blowing agent decomposed. The product was then cooled and wound on a collecting roll. The product had a textured surface caused by raised areas of about 0.015 inch in depth which corresponded to the area printed with the ink containing the blowing agent. The product could be utilized directly as a floor covering. The solid transparent wear layer of 0.005 inch in thickness had excellent resistance to wear and staining.

Any departure from the foregoing description which conforms to the present invention is intended to be included within the scope of the claims.

What is claimed is:

1. A process for producing a resinous layer having an embossed surface, which comprises applying a composition containing a blowing agent to portions of the surface of a layer of resinous composition containing an accelerator which substantially lowers the decomposition temperature of said blowing agent, said blowing agent being soluble in at least one component of said resinous composition, allowing a portion of said blowing agent on the surface of said layer to migrate into said layer and contact said accelerator, heating said layer to decompose the portion of the blowing agent in said layer without decomposing the remaining portion of the blowing agent on the surface of said layer thereby forming raised areas on the surface of said layer which correspond to the areas of application of said blowing agent and thereafter cooling the product thus formed.

2. The process of claim 1 wherein said resinous composition is a plasticized polymer of vinyl chloride.

3. The process of claim 1 wherein a second resinous composition is applied over said layer prior to said heating to decompose the blowing agent.

4. The process of claim 1 wherein said blowing agent is applied to a base and said resinous composition is applied over the blowing agent on said base.

5. The process of claim 1 wherein said blowing agent is printed on the surface of said layer utilizing an ink composition containing said blowing agent.

6. The process of claim 1 wherein said accelerator is a metal salt.

7. The process of claim 1 wherein said resinous layer is heated to at least partially gel the composition prior to application of said blowing agent.

8. The process of claim 1 wherein said blowing agent is a compound having the formula $$R O \overset{O}{\underset{\|}{C}} - N = N - \overset{O}{\underset{\|}{C}} - O R'$$

wherein R and R' are hydrocarbon groups containing from one to 20 carbon atoms.

9. The process of claim 8 wherein said blowing agent is diethylene bis (ethyl azodicarboxylate).

10. The process of claim 8 wherein said blowing agent is diethyl azodiformate.

11. The process of claim 8 wherein said blowing agent is diisopropyl azodiformate.

12. A resinous composition layer having an embossed surface, which comprises a layer of resinous composition having raised areas on its surface, each of said raised areas corresponding to a cellular foam area within said layer and having on its surface undecomposed blowing agent.

13. The resinous composition layer of claim 12 wherein said undecomposed blowing agent is on the undersurface of said layer.

14. The resinous composition layer of claim 13 wherein said layer is secured to a base.

15. The resinous composition layer of claim 14 wherein said composition is a plasticized polymer of vinyl chloride and said blowing agent is a compound having the formula $$R O \overset{O}{\underset{\|}{C}} - N = N - \overset{O}{\underset{\|}{C}} - O R'$$

wherein R and R' are hydrocarbon groups containing from one to 20 carbon atoms.

References Cited

UNITED STATES PATENTS 3,293,108  12/1966  Nairn et al. _____ 264—47

JAMES A. SEIDLECK, *Primary Examiner.*

L. GARRETT, *Assistant Examiner.*